Patented Oct. 10, 1939

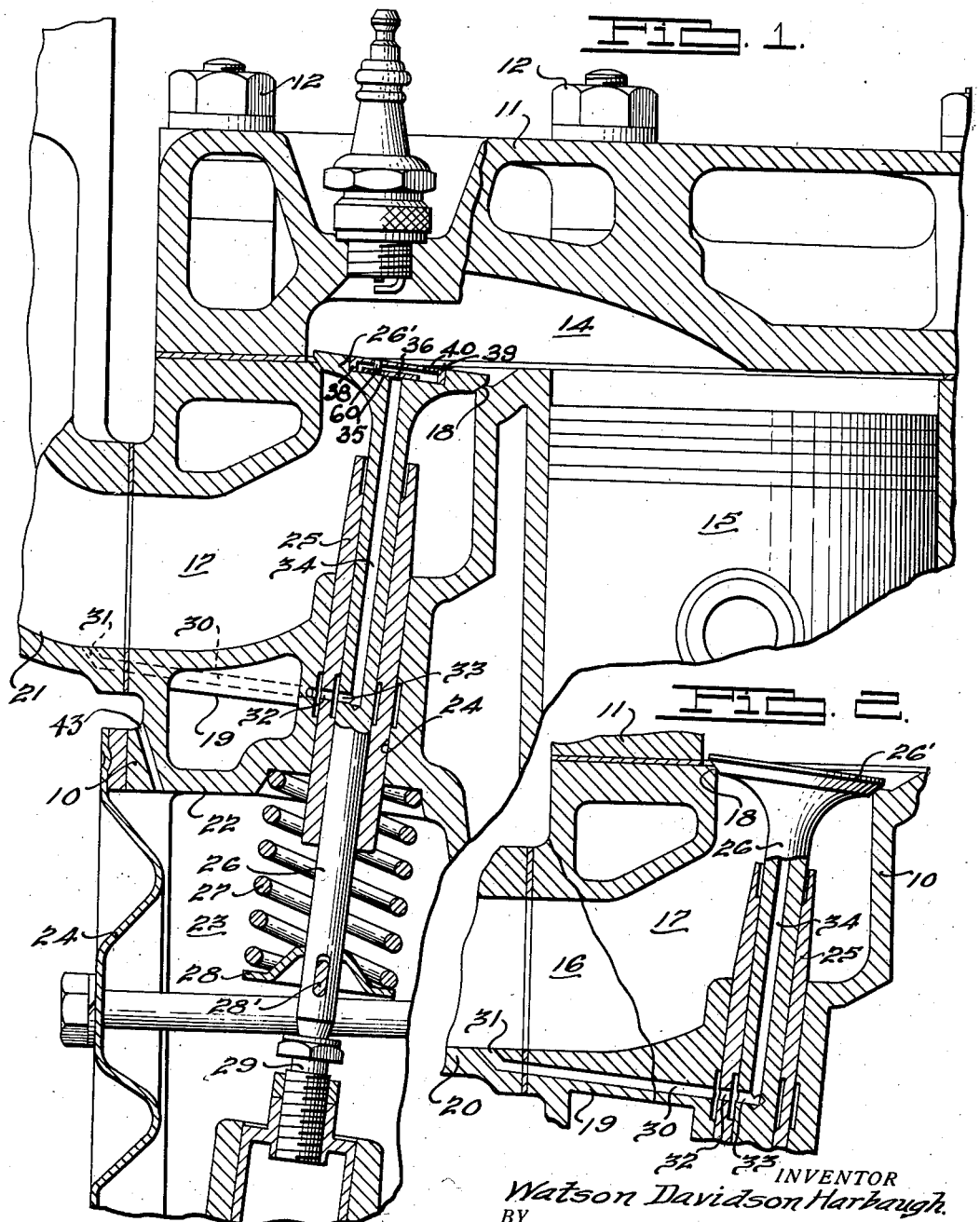

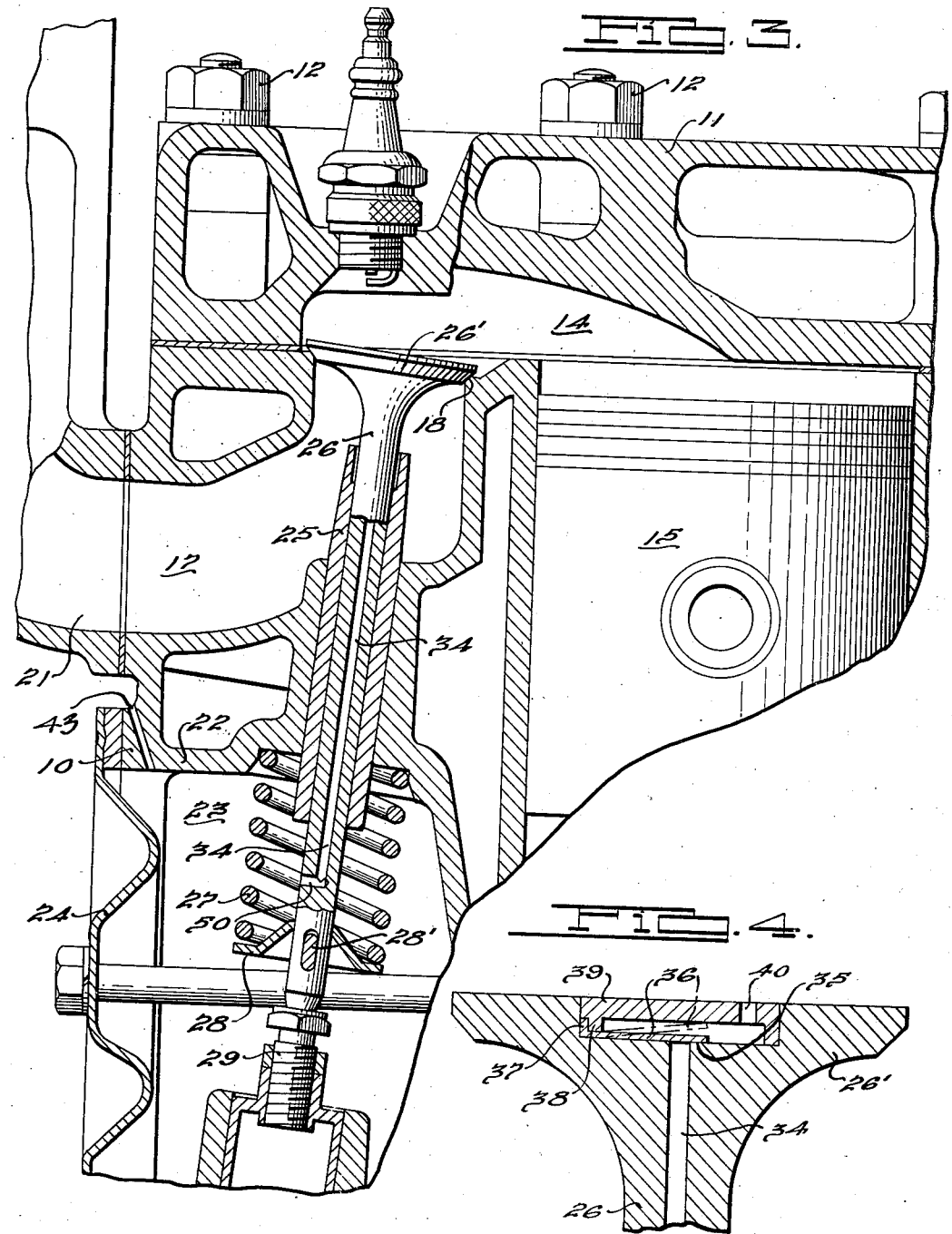

2,175,261

UNITED STATES PATENT OFFICE 2,175,261

INTERNAL COMBUSTION ENGINE

Watson Davidson Harbaugh, Chicago, Ill., assignor to Packard Motor Car Company, Detroit, Mich., a corporation of Michigan Application June 15, 1937, Serial No. 148,330

9 Claims. (Cl. 123—177)

This invention relates to internal combustion engines and more particularly to means for and the method of cooling valve structures.

An object of the invention is to provide for economical cooling of an engine cylinder valve by utilizing piston created suction for moving fluid in a heat transfer relationship.

Another object of the invention is to abstract heat from an engine valve by utilizing a fluid that can be drawn through the valve into the cylinder by suction without varying the fuel and air ratio of the combustible mixture.

A further object of the invention is to utilize the carbureted fuel mixture of an internal combustion engine as the cooling agent for a valve structure.

Another object of the invention is to provide for the cooling of an engine exhaust valve by the fuel mixture moved in heat transfer relation therewith by piston created suction.

Another object of the invention is to provide an improved method of cooling an exhaust valve for internal combustion engines.

Other objects of the invention will appear from the following description taken in connection with the drawings, which form a part of this specification, and in which:

Fig. 1 is a fragmentary vertical sectional view of an internal combustion engine having the invention incorporated therewith;

Fig. 2 is another similar sectional view taken on another line showing the connection between the valve and the intake manifold;

Fig. 3 is a view similar to Fig. 1 of a modified form of the invention in which air is utilized as the valve cooling medium;

Fig. 4 is an enlarged sectional view of a modified form of exhaust valve head.

In the drawings, the numeral 10 indicates the cylinder block of an internal combustion engine on which the head block 11 is fixed by conventional securing means 12. In the block 10 is formed a cylinder 13 and communicating with the cylinder is an offset combustion chamber 14 in the head block. Piston 15 is arranged to reciprocate in the cylinder.

In the cylinder block is a fuel intake passage 16 leading to the combustion chamber and adjacent the intake passage is formed an exhaust gas outlet passage 17 that leads from the combustion chamber. The inner ends of these passages are formed to provide valve seats, as indicated at 18, and such passages are separated by a wall 19. Manifolds 20 and 21 are connected respectively with the passages 16 and 17 so that a mixture of fuel and air is drawn into the cylinder from manifold 21 through passage 16 during the piston suction and exhaust gas is expelled from the cylinder through the passage 17 and manifold 21 during the piston exhaust stroke.

Similar valve mechanisms are associated with the intake and exhaust passages to control the movement of fuel and exhaust gas. The cylinder block is formed with a wall 22 providing a side chamber 23 closed by a removable plate 24 and a breather passage 43 connects the chamber with atmosphere. In the wall 22 is an opening 24 for receiving a guide sleeve or bushing 25. The stem 26 of a poppet exhaust valve is slidably mounted in the guide sleeve and the end extending into the passage 17 is formed with a head 26' for cooperation with seat 18. A coil spring 27, arranged in the side chamber, telescopes the valve stem and normally holds the valve head in seated position. One end of the spring bears against the wall 22 and the other end bears against a retainer 28 engaging with pin 28' anchored to the valve stem. A cam operated tappet is slidably mounted in the cylinder block and carries an adjustable bolt 29 against which the valve stem engages. While the intake valve structure is not shown it will be understood that it corresponds to the exhaust valve structure so far described which is conventional.

In many internal combustion engines, the valves become heated to an undesirable extent and this is particularly true of the exhaust valves. It is the purpose of this invention to provide for the cooling of a valve by moving a heat absorbing fluid therethrough by piston created suction in the cylinder so that no extra equipment is required as the motive power.

In the preferred form of the invention, a part of the fuel mixture taken from the intake passage is utilized as the cooling medium so that the fuel and air ratio of the main combustion charge in the cylinder will not be changed and, also, to utilize the absorbed heat for increasing the operating efficiency of the engine. A passage 30 is formed in the cylinder block and it connects a passage 31, open preferably to the lowest point in the intake manifold 20, with a passage 32 through the exhaust valve guide sleeve. The passage 32 terminates interiorly in a circular recess of sufficient length in an axial direction to remain open to a radial passage 33 formed in the valve stem in its range of movement. Passage 34 extends axially from the radial passage 33 through the valve stem and head, the head end of the passage being of enlarged diameter to form a chamber 35 for check valve 36. This check valve should be light in weight and of a character such that valve inertia has little effect regarding its seating, also it should be mounted so that suction in the cylinder will readily move it to open position and pressure in the cylinder will hold it in seated position. The preferred form of check valve, shown in Fig. 1, is formed as a thin metal wafer having an opening therethrough into which guide pin 60 extends. This pin is carried by plug 39 having a flanged periphery 38 pressed into the head end of the enlarged axial passage. In the plug is an opening 40 that is offset from the check valve in order that it will not be covered when the check valve is in either closed or open relation with its seat 35.

Another form of check valve is shown in Fig. 4, the plug in this instance having a portion of its flange 38 cooperating with a flanged portion 37 of a thin metal disk to clamp it in the valve head recess.

The check valve in either of its forms is of a resilient character, such that it normally closes the passage 34 from the combustion chamber 14. During the suction stroke of the engine piston 15, the valve 36 will be moved to open position by suction, as shown in dotted lines in Fig. 4, so that the fuel in the manifold passage 16 will be drawn into the combustion chamber 14 through passages 30, 32, and 34, and opening 40. When the engine piston is in its pressure stroke, the pressure created in the cylinder will be exerted against the valve 36 in its closed position, so that the fuel connection through the valve is shut off. A passage 30 connects preferably with a low point in the main fuel passage 16, so that liquid fuel collecting in the main passage will be drawn through the exhaust valve and gasified by the temperature thereof in its travel, before it reaches the combustion chamber.

Heat abstracted from the valve added to the normal fuel mixture increases the engine efficiency by assisting in gasifying liquid fuel in the charge drawn into the cylinder. Sometimes the intake manifold becomes flooded and difficulty is encountered in starting the engine while hot, and the present arrangement is valuable in such case because liquid collected in the manifold will be drawn through the exhaust valve and vaporized before entering the cylinder. Furthermore, during cold weather conditions, liquid collected in the low part of the intake manifold will be drawn through the cold exhaust valve into the cylinder in starting the engine to enrich the charge and thus aid in obtaining quick combustion.

In the form of the invention shown in Fig. 3 the valve passage 34 is connected by a radial passage 50 in the stem with the interior of the chamber 23. As this chamber is open to atmosphere through passage 43, air will be drawn through the chamber 23 and the valve during movement of the piston away from the cylinder head and will serve as a cooling medium for both the chamber and the valve.

With both forms of the invention, efficient valve cooling is provided for in a simple manner.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In an internal combustion engine, a cylinder, a valve having a passage therethrough, means connecting the valve passage with a cooling fluid, and a check valve at the outlet end of the valve passage opening toward the cylinder interior, said check valve being opened and cooling fluid drawn through the valve passage by suction developed in the cylinder.

2. In an internal combustion engine, the combination of a cylinder, a valve having a passage therethrough leading to the cylinder, a main fuel supply means leading directly to the engine cylinder, and a connection between the passage in the valve and the fuel supply means, the fuel passing through the valve cooling the same, and augmenting the charge delivered into the cylinder from the main supply means.

3. In an internal combustion engine having a cylinder and a piston in the cylinder, the combination of an exhaust valve for the cylinder, said valve having a passage therethrough leading from a supply of cooling medium to the interior of the cylinder, and a check valve associated with the outlet end of the passage, said check valve being moved to open position by piston created suction in the cylinder.

4. In an internal combustion engine, the combination of a cylinder, a valve for the cylinder having a passage therethrough, means for feeding a carbureted fuel mixture to the cylinder, and means for moving fuel from the feeding means through the passage in said valve to absorb heat therefrom.

5. In an internal combustion engine, the combination of a cylinder and an exhaust valve, said valve having a passage therethrough leading from a source of fluid to the interior of the cylinder, and a check valve carried by the exhaust valve and associated with the passage therein, said valve being unseated in response to suction in the cylinder.

6. In an internal combustion engine, a cylinder having a piston therein, means for feeding a fuel mixture to the interior of the cylinder, an exhaust valve associated with the cylinder outlet, said valve having a passage therethrough opening into the cylinder, a connection between the valve passage and the fuel mixture feeding means, and a check valve associated with the valve passage, said check valve being opened by suction in the cylinder.

7. A poppet valve comprising a head, a stem having a passage leading therethrough, said head having an axially extending passage therethrough connected at one end with the passage in the stem and terminating at the other end in an enlarged portion, a check valve in the enlarged portion of the passage in the end, and a plug in the head enclosing said check valve, said plug having an opening therethrough remote from the check valve.

8. A valve comprising a stem, a head having a recess in its end, said stem and said head having a passage therein open to the recess at one end and opening through the stem at the other end, a leaf check valve in the head recess adapted to normally close said passage, and a plug in the recess anchoring and enclosing said check valve, said plug having an aperture through its end wall.

9. In an internal combustion engine, the combination with a cylinder and a piston in the cylinder, of a poppet valve having a passage therein opening through the head end thereof and communicating with atmosphere exterior of the engine, air being drawn through the valve passage into the cylinder entirely by piston created suction.

WATSON DAVIDSON HARBAUGH.